United States Patent Office 3,326,053

Patented June 20, 1967

3,326,053
PROCESS AND APPARATUS FOR IMPROVED
GYROSCOPE OPERATION
Thomas E. Elbert, Milwaukee, and Frank R. Archibald, Shorewood, Wis., assignors to General Motors Corporation, Detroit, Mich., a corporation of Delaware
No Drawing. Filed May 20, 1963, Ser. No. 290,270
6 Claims. (Cl. 74—5)

This invention relates to gyroscopes and more particularly to a process and apparatus useful in prolonging the useful life of gyroscopes used in inertial guidance systems.

It is readily apparent that the gyroscope is the most important single element affecting the accuracy and reliability of an inertial guidance system. It is equally cognizable that the accuracy of an inertial guidance system is limited by the inherent tendency for a gyroscope to drift. A tendency for a gyroscope to precess, or drift, is caused from slight shifts of the gyroscope rotor axis on its bearing supports, in effect, gyroscope instability. The smallest degree of error possible by inertial guidance is a direct function of the degree of gyroscope instability. Hence, as the sensitivity of an inertial guidance system, as a whole, is increased the instability of the rotor axis becomes increasingly significant.

It has long been appreciated that the stability of a rotor in an inertial guidance system gyroscope decreases the longer it is run. Heretofore, this did not present an especially significant problem, since the gyroscope was rarely run long enough, before it finished serving its purpose, to produce an intolerable rotor instability. Despite the fact that the guidance system of a missile, for example, is only used for several minutes, the gyroscopes of that system ordinarily are run several hundred hours before the system is used. The gyroscope is "run-in" for over a hundred hours before it is even installed in a guidance system. The gyroscope is operated to check out the system before installation in the missile. It is run again to check out the system after installation in the missile and run again before firing the missile to check and stabilize the guidance system. Until recently the total running time involved was not frequently sufficient to produce an intolerable change in gyroscope performance. However, as the complexity of the guidance system and the vehicle incorporating the guidance system increases, the number of hours of running for check out time of the vehicle and system increases. Therefore, there is a greater likelihood that a gyroscope will fail prior to the time the system is needed.

Moreover, while it was known that gyroscope performance would eventually be deleteriously affected by extended running, one could not even predict with reasonable certainty when failure would occur. Failure might occur after running over 500 hours yet an apparently identical gyroscope assembly might satisfactorily perform up to 1400 hours. Consequently, it has been a practice to replace the gyroscopes in a missile guidance system after a given number of hours running, even though they have not failed, because the probability of failure at any time becomes too great.

Of further relevance is that current interest is manifested in inertial guidance systems having gyroscopes which are to be run continuously. A system such as this would be incorporated in a missile which is to be ready for immediate firing at all times. Moreover, it is evident that inertial guidance systems are useful as navigational aids in other vehicles. Sighting, aiming and other directions assists may include inertial guidance. All of these uses involve extended periods of system, hence gyroscope, operation. Thus, the longstanding problem of use deteriorating rotor stability is becoming increasingly more vexing.

It is an object of this invention to provide a gyroscope assembly and a method of operating the gyroscope which will permit vastly longer periods of use without deleteriously increasing gyroscope rotor instability.

It is a further object of this invention to provide an improved process of lubricating gyroscope bearings and other precision bearing assemblies to increase their life and permit extended operation of gyroscopes and the like without substantially any change in performance.

A still further object is to provide a method of providing a suitable environment for operating a rotating element, such as a gyroscope rotor.

Among other objects, features and advantages of the invention is to provide means for improving the life of rolling element bearing assemblies, such as gyroscope bearing assemblies. These and other objects of the invention are attained by running a precision bearing assembly, such as a gyroscope bearing assembly, in an unusually low oxygen atmosphere.

Gyroscopes supported by rolling element bearing assemblies have been operated in low oxygen environments for many years. It has been recognized for quite some time that gases lighter than oxygen and nitrogen have better heat transfer characteristics. For this reason and to have less windage, it has been preferred to run the gyroscope in a light gas atmosphere, rather than air. As the light gas atmosphere was established primarily for these reasons, little concern, if any, was given as to how much oxygen was left in an environment, once it was substantially replaced. No consideration was given to the concept that residual amounts of oxygen might have a detrimental effect on gyroscope operation. Consequently, when replacing the environmental air with hydrogen, helium, or other light gas, the process was not sufficiently controlled to produce a substantially oxygen-free light gas environment. In fact, typical methods of providing a light gas atmosphere resulted in an atmosphere containing at least about 1.5%, or 15,000 parts per million, air, by volume.

A typical example of the process used to replace the air in a gyroscope enclosure with a light gas is to evacuate an enclosure to about ⅙ atmosphere at room temperature. As soon as the pressure was reduced ⅙ to atmosphere, the light gas was introduced into the enclosure. As much light gas as that sufficient to raise the pressure in the enclosure back to 1 atmosphere may be used. It is then re-evacuated to ⅙ atmosphere pressure, backfilled with light gas up to a pressure as high as 1 atmosphere, evacuated still a third time to about ⅙ atmosphere pressure and backfilled again with light gas to a pressure as high as 1 atmosphere. Each of these steps is immediately successive, there being no appreciable time interval between the individual steps or in a single step where a given atmosphere is maintained, until the last backfilling with light gas. Such a method, even theoretically, obviously must still leave at least about a ½₁₆ aliquot, about 0.5%, of the original atmosphere in the environment.

Thus, the smallest proportion of oxygen which could be present is about 0.1%, by volume. Actually the light gas environment formed by the described method container far in excess of this. No particular concern was given to the purity of the light gas used, so that it frequently contained as much as 0.30% oxygen. The connections involved in evacuation and filling with light gas may not have been completely vacuum tight. The light gas lines may not have been sfficiently cleared of air before use. In addition, this method of atmosphere replacement, as best, does not provide means to remove air introduced into the environment due to outgassing of the various materials within the enclosure and those forming it. As a result, within a few hours after the typical evacuation procedure, the minimum oxygen concentration, if even attained at all, would rise from 0.1% to about 0.2%.

While it is appreciated that a pluraliy of successive evacuations and backfillings with the light gas eventually can reduce the initial oxygen concentrations to as low as is desired, this is not sufficient to produce a satisfactory environment unless the repeated evacuations and purgings are conducted for a sufficient duration to also remove a substantial portion of the absorbed and adsorbed air. To do so is very time-consuming and not heretofore deemed to be of any advantage. Hence, no attempt was even made to do so. Consequently, the atmosphere in which the gyroscope was run, at least contained approximately 1000 parts per million oxygen and, in many instances, over twice that amount.

We have found that such an environment is the principal cause of early gyroscope failure. We have found that even extremely minute amounts of oxygen can have a highly detrimental effect on a precision bearing assembly such as a gyroscope bearing assembly. For example, we have found that the life of tolerable gyroscope performance can be increased tenfold merely by running it in an environment containing less than about 0.03 part per million of oxygen, for each 3 to 8 milligrams of oil used in lubricating the bearing. Moreover, we have found that, the oxidation rate being equal to the oxygen in-leak rate, a level of less than 0.002 part per million will produce a life of tolerable gyroscope performance greater than 10,000 hours.

It appears that the oxygen contained in the light gas environments gyroscopes customarily are operated in is sufficient to detrimentally react with the oil lubricating the rolling element bearing assemblies supporting the gyroscope. Eventually an oil oxidation product is formed in sufficient quantity on the assembly to result in erratic momentary changes in rotor axial disposition of greater magnitude than the original drift inherent in the gyroscope when made, i.e., jogs. Therefore, the net result is that the gyroscope is not as sensitive as it initially was. Once the oil degradation products form sufficiently, the jogs become large enough to reduce the sensitivity of the gyroscope beyond tolerable limits of its system. We have found that by reducing the concentration of the oxygen to less than about .002 part per million and maintaining it as this level we have, in effect, reduced the rate of lubricant oxidation to a point where it is no longer an existing problem.

Gyroscope assemblies are frequently contained in a float. The gyroscope is enclosed within and supported by a sealed canister which is suspended in a medium having a density substantially the same as the apparent density of the canister. The canister is generally referred to as a "float." Hence, in order to incorporate our preferred invention in such a gyroscope assembly we contemplate a float atmosphere in which the oxygen content is maintained at less than approximately .002 part per million.

The following procedure serves as a specific example of one method by which an atmosphere containing less than about .002 part per million oxygen can be attained. In contrast to the prior atmosphere replacement methods, this procedure is rigidly controlled and substantially more extensive in nature. The enclosure in which the gyroscope is to be run, such as the gyroscope float, is attached by means of a vacuum-type connection to an atmosphere replacement system. The system, itself, is vacuum tight, all lines are exhausted of air and the system is connected to a source of pure light gas, e.g., helium, etc. The light gas, of course, should not be deleteriously reactive with the lubricant and any of the previously mentioned light gases can be used. Obviously, it is preferred that the light gas used be as oxygen-free as can be obtained. The float is evacuated to a pressure of approximately 0.01–0.1 micron of mercury and maintained at this pressure for approximately 20 to 24 hours. The float is then backfilled with the light gas to a pressure of from about 0.5–1 atmosphere. The float is then re-evacuated to a pressure of approximately 0.01–0.1 micron of mercury and held there for about one hour. The float is then refilled with the light gas to a pressure of 0.5–1 atmosphere and evacuated again to a pressure of about 0.01–0.1 micron of mercury, where it is maintained for about one hour. The float is again backfilled with the light gas to a pressure of about 0.1–1 atmosphere. That quantity of atmosphere in the float is then exposed to oxygen getters for approximately 50 to 80 hours. The exposure of the atmosphere to the oxygen getter can be accomplished by circulating the atmosphere over sodium, potassium or the like in and out of the float, or any other convenient manner. Contact with the getter is then terminated and the float assembly is sealed. To insure that the oxygen level does not subsequently rise beyond desirable limits, it may be desirable to include an oxygen getter within the sealed float. Then, the oxygen level will remain low, even though oxygen leaks into the float due to additional outgassing, faulty sealing, etc. In such instance, one can use the getter means described in United States patent applications A–1109 and A–1112, each entitled, "Gyroscope Assembly," which are assigned to the assignee of the present application, and which are being filed simultaneously herewith.

In addition, a more effective replacement is attained by maintaining the float at an elevated temperature during the entire replacement procedure. We prefer to use a temperature of about 165° F.

Another way to reduce lubricant degradation product buildup on the bearings is by limiting the volume of oxygen which is available for contact with the bearing assembly. This volume must be less than that which is sufficient to form enough of the oil oxidation product to deleteriously alter gyroscope performance. The oxygen volume is reduced if the total atmosphere volume is reduced. The total atmosphere volume can be reduced in various ways. The gyroscope enclosure can be made smaller, its configuration can be changed to have a lesser interior volume, etc. This may be somewhat meaningful with higher oxygen concentrations, for example, about 0.03 part per million. However, with lower oxygen concentrations, the variation in atmosphere quantity is of correspondingly lesser significance. At 0.002 part per million of oxygen, variation in overall atmosphere volume has little or no effect.

Analogously, the volume of lubricant can be reduced. However, it apparently takes only a very small amount of lubricant to form enough oxidation product to produce a jog. This prevails even in the gyroscope rolling element bearing assemblies where the amount of lubricant within the float is generally quite small. Only enough lubricant is applied to each gyroscope ball bearing assembly as will adhere to it at operating speed. Each of the gyroscopes for the Titan missile guidance system, for example, has two ball bearing assemblies supporting it. Each bearing assembly is lubricated with about 1.5 to 4 milligrams of lubricant. This is typical of many gyroscopes presently in use for inertial guidance systems. However, only 2% to 5% of this amount of lubricant is actually used in the working part of the bearings. For the higher oxygen concentrations, the total amount of oxygen is preferably not more than 5%, by weight, of the smallest amount of lubricant actually used. This amount of oxygen preferably should not be available at a rate greater than the preferred total amount of oxygen divided by ten times the desired bearing life. For the Titan 2FBG (Floated Beryllium Gyro) bearing, this amounts to 0.001 cc. of oxygen at standard temperature and pressure. Of course, if the oxygen level can be maintained at lower concentrations, especially at about 0.002 part per million, or below, variation in the total volume of oxygen produces negligible effects.

A significant feature of the first manner we propose for reducing jog, control of oxygen concentration, is that it is independent of the size of the bearing, quantity of oxygen, quantity of lubricant or the like. One merely reduces and maintains the oxygen concentration to below about .002 part per million. The rate of oxygen degradation of the lubricant is diminished to such an extent that regardless of what quantity of atmosphere is used, an improvement is certain to be obtained. The extent of the improvement, of course, can be affected by atmosphere volume, in some instances, but the effect is merely to limit the extent of the improvement. Accordingly, in order to insure maximum benefit is attained by the invention, we prefer to use an oxygen concentration below .002 part per million in an atmosphere volume which does not contain more than about 0.5% of the actual weight of lubricant used in weight of oxygen at standard temperature and pressure.

To illustrate the manner in which improved results have been obtained with the invention are the comparative tests set forth in the following two tables. Identical 2FBG gyroscope units, such as used in the Titan missile inertial guidance system, were made and run in helium atmospheres. The helium atmosphere initially established for each of the units is as shown in the tables. The units referred to in Table I each had the same steady oxygen in-leak rate, this rate being sufficient to maintain an initial oxygen concentration of 0.03–0.17 part per million substantially constant even while oxygen is consumed by the lubricant during the test. The units referred to in Table II had no appreciable in-leak of oxygen, it being precluded by surrounding the float with a 1–10 micron vacuum. The duration of continuous running before failure is as indicated:

TABLE I

| Unit | Residual Oxygen Concentration (p.p.m.) | Hours to Failure |
| --- | --- | --- |
| 3 | 0.05 | 212 |
| 4 | 0.07 | 216 |
| 11 | 0.06 | 217 |
| 12 | 0.08 | 96 |
| 13 | 0.03 | 217 |
| 14 | 0.06 | 192 |
| 15 | 0.17 | 192 |
| 16 | 0.15 | 192 |
| 17 | 0.10 | 192 |
| 18 | 0.11 | 192 |
| 19 | 0.07 | 210 |
| 20 | 0.17 | 222 |
| 21 | 0.14 | 195 |

TABLE II

| Unit | Residual Oxygen Concentration (p.p.m.) | Hours Run Without Failure |
| --- | --- | --- |
| 26 | 0.03–.2 | 7,347 |
| 27 | 0.03–.2 | 7,228 |
| 29 | 0.03–.2 | 2,999 |
| 30 | 0.03–.2 | 6,832 |

It can, therefore, be seen that it is necessary to run the gyroscope in the unusually oxygen-free light gas atmosphere to increase the useful life of a gyroscope bearing assembly.

It is to be understood that although this invention has been described in connection with certain specific examples thereof, no limitation is intended thereby except as defined in the appended claims.

We claim:

1. The process which comprises placing a rolling element bearing assembly in an enclosure, establishing an atmosphere containing less than about 0.002 part per million oxygen in said enclosure, and running said assembly in said atmosphere.

2. The process of operating a precision bearing assembly which comprises lubricating a rolling element bearing assembly with a quantity of lubricant not substantially greater than that which will adhere to the assembly when it is running, and running said bearing assembly in an environment in which the total amount of oxygen available for reaction with said lubricant is less than about 0.5% of the actual weight of lubricant used by said bearing assembly.

3. The process of operating a gyroscope which comprises lubricating a gyroscope rolling contact bearing assembly with a quantity of lubricant which will adhere to said assembly while said gyroscope is running, and running said gyroscope in an atmosphere in which the oxygen concentration is less than about 0.03 part per million and the total volume of oxygen available for reaction with said lubricant is less than about 0.5% of the actual weight of lubricant at standard temperature used by said bearing assembly.

4. The process for making an environment for a precision bearing assembly which comprises placing a precision bearing assembly in an enclosure, applying a lubricant to said bearing assembly, evacuating said enclosure to a low pressure, maintaining said enclosure in the evacuated condition to induce outgassing of materials in and forming said enclosure, backfilling said enclosure with a substantially oxygen-free atmosphere, repeating said evacuating, maintaining and backfilling steps sufficiently to establish an initial oxygen concentration of less than about 0.03 part per million for each 3 to 8 milligrams of lubricant applied on said bearing assembly, and thereafter sealing said enclosure.

5. The process which comprises supporting a gyroscope on at least one rolling contact bearing assembly, applying a quantity of lubricant to said bearing assembly which will adhere to said assembly while said gyroscope is operating, placing said gyroscope and its supporting bearing assembly in a gyroscope float, evacuating said float assembly to a low pressure, maintaining said low pressure within said float to induce outgassing of materials in and forming said float, backfilling said float with a substantially oxygen-free light gas, repeating said evacuating, maintaining and backfilling steps sufficiently to establish an atmosphere having less than about 0.002 part per million oxygen, and running said gyroscope in said float.

6. The process recited in claim 5 in which the evacuating, maintaining and backfilling steps are all conducted at an elevated temperature.

References Cited

UNITED STATES PATENTS 2,711,356   6/1955   Ensinger _____ 74—5 X

OTHER REFERENCES

"The Behavior of Lubricated Ball Bearings in Controlled Atmospheres," W. A. Glaeser, Lubrication Engineering, February 1960, pp. 56–60.

FRED C. MATTERN, Jr., *Primary Examiner.*

BROUGHTON G. DURHAM, *Examiner.*

K. DOOD, J. D. PUFFER, *Assistant Examiners.*